_United States Patent Office_

2,703,817
Patented Mar. 8, 1955

2,703,817

PROCESS FOR THE PREPARATION OF LUBRICATING OIL ADDITIVES

George E. Serniuk, Roselle, N. J., assignor to Esso Research and Engineering Company, a corporation of Delaware No Drawing. Application June 27, 1950,
Serial No. 170,677

5 Claims. (Cl. 260—592)

This invention relates to lubricating oil additives and to a process for their manufacture. Particularly the invention relates to a process for the preparation of lubricating oil additives having the desirable characteristic of lowering the pour point of lubricating oils with which they are blended. More particularly, the invention relates to a process for the preparation of lubricating oil additives having pour point depressing properties which involves the simultaneous polymerization, acylation, and alkylation of vinyl aromatic compounds.

The art of the manufacture of lubricating oil additives has long been familiar with processes of modification of various aromatics and aromatic derivatives to produce compounds having the long side chains necessary to modify the low temperature crystalline structure of wax present in some lubricating oils. Such processes as alkylation and acylation of aromatic compounds such as benzene, naphthalene and their derivatives are well described in patent literature.

It is also known in the art that vinyl aromatics, such as vinyl benzene or styrene, can be polymerized either alone or with other olefinic hydrocarbons, to give linear molecules with recurring aromatic rings. The patent literature also describes processes for the modification of these polymers and copolymers by procedures of acylation, alkylation, and the like.

It is the object of this invention to furnish the art of lubricant additive manufacture with a new process for the preparation of these modified vinyl aromatic compounds which involves a simultaneous polymerization of the vinyl aromatics, to form the linear type molecule with recurring aromatic groups, accompanied by acylation and alkylation of the aromatic portion of the molecule with compounds having the requisite number of carbon atoms in a straight chain to give the desired wax modification properties. So far as applicant is aware, this is the first teaching of such a simultaneous process.

Broadly speaking, this improved process involves admixing a vinyl aromatic with a halo-alkane and delivering to the mixture a complex of an acid chloride and a Friedel-Crafts catalyst. The reaction may be effected in a diluent or a non-diluent system and at a wide range of temperatures. When high molecular weight products are desired the temperature should be low during the early part of the reaction when polymer formation is taking place and may be raised to complete the alkylation and acylation reactions. When the reaction is completed the catalyst is quenched with an alcohol, the product diluted with a hydrocarbon solvent and filtered to remove the catalyst-alcohol reaction product. The filtrate is then treated with a filter aid and again filtered. The final product is then recovered by stripping the solvent from the second filtrate by a distillation step.

In carrying out the improved process of this invention, any of the commonly known vinyl aromatics, either substituted or not, may be used. For example, styrene, alpha-methyl styrene, para-methyl styrene, alpha-methyl para-methyl styrene, vinyl naphthalene, vinyl anthracene, vinyl carbazole and the like are operable vinyl aromatics. Styrene is the preferred compound however, due to its economic advantage, and is utilized in the preferred embodiment.

A wide range of alkylating agents are operable in this improved process. In general, alkyl halides of varying molecular weight prepared by any of the following general reactions may be employed:

(a) By replacement of an "OH" group in alcohols by a halogen by means of hydrogen chloride, hydrogen bromide, hydrogen fluoride, etc., or by the reaction "OH" group with dry HCl over a catalytic surface or by the reaction of the "OH" group with PCl₅, PCl₃, or SOCl₂ and the like.

(b) By the addition of halogen acids to unsaturated hydrocarbons to yield primary, secondary, or tertiary halides or by the addition of HX to unsaturated esters.

(c) By the halogenation of saturated hydrocarbons, which process may be effected in the absence of a catalyst at moderately high temperatures or moderately low temperatures in the presence of Friedel-Crafts catalysts.

Exemplary of the low molecular weight halo-alkanes which may be used are methyl chloride, methyl bromide, ethyl chloride, ethyl fluoride, isopropyl chloride, any of the several amyl or hexyl chlorides, normal or iso-octyl chloride, or 1-fluoro, 2-methyl propane. Higher molecular weight members of the halo-alkane series such as the lauryl chlorides, the lauryl fluorides, the octadecyl chlorides, the octadecyl fluorides or mixtures of the above may be used. Halogen derivatives of substances which consists of a mixture of hydrocarbons such as paraffin wax, petroleum and the like or halogen derivatives of hydrocarbon oils such as naphtha, kerosene, gas oil, or lube oil fractions are operable. If a singe halo-alkane is used it is preferred that the secondary halo-alkanes be utilized, that is, those halo-alkanes in which the halogen atom is not on the terminal carbon atom. Especially preferred and contemplated in the preferred embodiment are the chlorinated paraffin waxes containing from about 8 to 32 carbon atoms chlorinated to a chlorine content of from about 8% to 14.5%.

As was mentioned above, the acylating agent and the desired catalyst are added to the reaction mixture in the form of a complex. This complex is prepared outside the reaction zone by admixing the catalyst and the acylating agent, usually in a suitable solvent such as ethylene dichloride, nitromethane, nitrobenzene, or o-dichlorobenzene, etc., and the complex is added slowly to the reaction mixture. The acylation agent may consist of any of the saturated organic monobasic acid chlorides having from 2 to 24 carbon atoms, preferably those containing from 10 to 20 carbon atoms which may be prepared by treating the desired fatty acid with at least a 100% excess of PCl₃. The catalyst used may be any of the well known Friedel-Crafts catalysts such as AlCl₃, AlBr₃, AlBr₂Cl, AlClBr₂, Al₂Br₆Cl, AlBr₂OH·AlBr₃, AlIBr₂, BF₃, and the like. AlCl₃ is the preferred catalyst.

The temperature limitations upon the process of this invention are varied. Although there is some polymerization, alkylation and acylation going on during the initial stages of the reaction, polymerization of the vinyl aromatic is principal. During the initial stages, then, the temperature of the reaction mixture is adjusted to one most favorable to obtain the desired degree of polymerization. If a high molecular weight product is desired, the reaction temperature should be held in the initial stages of the reaction to one within a range of from —20° C. to about 50° C., lower temperatures allowing a greater degree of polymerization and a consequent higher molecular weight. In the second stage of the reaction, of principal occurrence are the alkylation and acylation reactions, and during this stage the temperature should be allowed to rise from the temperature of the initial stage. Temperatures of from 60° C. to 100° C. are satisfactory for this second stage, and one within a range of from 75° C. to 80° C. is preferred.

The proportions of the constituents of the reaction mixture may be varied widely, depending upon the final product desired. At the outset it may be stated that the preferred embodiment of the invention contemplates the use of equimolar proportions of the vinyl aromatic, alkylation agent, acylation agent, and catalyst. The one absolute limitation on the process is that the proportions be so adjusted that there results an oil soluble product having a sufficient number of long chains to confer upon it the desired wax-modifying characteristics. When equimolar proportions of the vinyl aromatic and alkylation agent are used, the acylation agent may be varied from 0.1 to 1.0 moles.

Thus, when it is elected to use varying ratios of acylating agent corresponding to less than a molar proportion based on the vinyl aromatic, the proportion of the alkylating agent may be increased if desired by that molar quantity corresponding to the difference between one mol and the actual fraction of a mol of the acylating agent used.

As stated above, the reaction may be carried out in the presence of or absence of a diluent. It is generally preferred to utilize the ease of control of product quality inherent in the diluent technique, and among operable diluents may be mentioned ethylene dichloride, carbon disulfide, nitrobenzene, nitromethane, orthodichlorobenzene, in brief, any of the inert polar diluents with which the art is familiar.

The final product of this invention may be blended directly with the lubricating oil base. Concentrations within a range of from 0.03% to 10% by weight of the additive material in the lubricant will be operable and will give the desirable wax modifying characteristics. Oil compositions containing from 0.5% to 5.0% by weight of the additive material are preferred. However, oil concentrates of the additive material, containing from 10% to 80% by weight, may also be prepared and the final lubricating composition prepared using this concentrate.

The concept of this invention may be more clearly explained by reference to the following examples.

EXAMPLE I

A 2 liter 3-way flask, fitted with a mechanical stirrer, condenser, gas outlet tube, delivery funnel and thermometer, was charged with 52 g. of momeric styrene and 186.2 g. of chlorinated wax containing 10% of Cl. Five cc. of a complex, formed by combining 39.25 g. of acetyl chloride and 66.6 g. of anhydrous $AlCl_3$ in 200 cc. of ethylene dichloride, was added dropwise to the charge at 50° C. The ensuing reaction gave a temperature rise to 100° C. HCl gas was evolved during this reaction. When the temperature began to drop a total of 100 cc. of ethylene dichloride was added. The remainder of the complex solution was then added over a period of two hours. The reaction temperature was raised from 50° C. to 75–80° C. and held there for three hours. The catalyst was then quenched by a slow delivery of 200 cc. of methanol. The reaction mixture was allowed to stand overnight. On the following day the product was diluted with benzene and the solution filtered away from the crystalline reaction product formed by the action of methanol on the $AlCl_3$. The filtrate was treated with Attapulgus clay and after settling was subjected to filtration. The solvents were stripped from the product by distillation using superheated steam and a maximum bottoms temperature of 316° C. Recovered were 144 g. of a highly viscous, somewhat dark colored product. The ASTM pour data for this product are presented in the accompanying Table I, entitled "Alkylated and acylated polystyrene as lube oil pour point depressants."

EXAMPLE II

In this experiment the equipment, the amount of styrene and chlorowax was the same as in Example I. In this case the complex used was formed by combining 109.38 g. of lauroyl chloride with 66.6 g. of $AlCl_3$ in 100 cc. of ethylene dichloride. The procedure and conditions for the reaction were otherwise the same as described under Example I. This reaction yielded 225 g. of a highly viscous product. The evaluation of this product is presented in the accompanying table.

EXAMPLE III

The reaction in this case was the same as described in Example I with the exception that a complex formed by combining 123.41 g. of myristoyl chloride and 66.6 g. of $AlCl_3$ in 100 cc. of ethylene dichloride was used in place of acetyl chloride-$AlCl_3$ complex. Recovered 229 g. of highly viscous product. The ASTM pour data are presented in the table.

EXAMPLE IV

This experiment was effected in a manner described in Example I in all details with the exception that a complex formed by combining 137.43 g. of palmitoyl chloride and 66.6 g. of $AlCl_3$ was used in place of the acetyl chloride-$AlCl_3$ complex. Recovered 248 g. of a highly viscous product possessing a greenish cast.

EXAMPLE V

In this case the experimental conditions and reactants were the same as described in Example I except that in place of the acetyl chloride-$AlCl_3$ complex there was used a complex formed by combining 151 g. of stearoyl chloride and 66.6 g. of $AlCl_3$ in 100 cc. of ethylene dichloride. Recovered 250 g. of a highly viscous greenish colored product.

*Table 1*

ALKYLATED AND ACYLATED POLYSTYRENES AS LUBE OIL POUR POINT DEPRESSANTS

| Exp. No. | Styrene, Moles | Chlorowax (10% Cl), Moles | Acid, #C | Acyl Chloride, Moles | $AlCl_3$, Moles | Ethylene Dichloride, cc. | Temperature Initial | Temperature Final | Product, Percent | Additive, Percent | A.S.T.M. Pour, °F. —Mid-Continent Oils —SAE 10 | 20 | 30 |
|---|---|---|---|---|---|---|---|---|---|---|---|---|---|
| Example I | 0.5 | 0.5 | 2 | 0.5 | 0.5 | 300 | 50 | 75–100 | 60 | 0 | +5 | +10 | +15 |
|  |  |  |  |  |  |  |  |  |  | 0.1 | −5 | 0 | +5 |
|  |  |  |  |  |  |  |  |  |  | 0.2 | −20 | −20 | +5 |
| Example II | 0.5 | 0.5 | 12 | 0.5 | 0.5 | 200 | 50 | 75–100 | 73 | 0.01 | −5 | +5 | +10 |
|  |  |  |  |  |  |  |  |  |  | 0.03 | −20 | −20 | −5 |
|  |  |  |  |  |  |  |  |  |  | 0.05 | −25 | −30 | −15 |
|  |  |  |  |  |  |  |  |  |  | 0.10 | −30 | <−35 | −25 |
|  |  |  |  |  |  |  |  |  |  | 0.20 | <−35 | <−35 | −35 |
| Example III | 0.5 | 0.5 | 14 | 0.5 | 0.5 | 200 | 50 | 70–100 | 70 | 0.01 | +10 | +5 | −5 |
|  |  |  |  |  |  |  |  |  |  | 0.03 | −5 | −15 | −25 |
|  |  |  |  |  |  |  |  |  |  | 0.05 | −20 | −20 | −25 |
|  |  |  |  |  |  |  |  |  |  | 0.10 | −30 | −30 | −25 |
|  |  |  |  |  |  |  |  |  |  | 0.20 | <−35 | −35 | −25 |
| Example IV | 0.5 | 0.5 | 16 | 0.5 | 0.5 | 200 | 50 | 80 | 73 | 0.1 | −20 | −25 | −25 |
|  |  |  |  |  |  |  |  |  |  | 0.2 | −25 | −30 | −30 |
| Example V | 0.5 | 0.5 | 18 | 0.5 | 0.5 | 200 | 50 | 80–85 | 71 | 0.1 | −10 | −25 | −5 |
|  |  |  |  |  |  |  |  |  |  | 0.2 | −20 | −30 | −20 |

As will be apparent from an examination of the data reported in Table I above, the products of this invention impart a desirable reduction of pour point to the lubricating oils with which they are blended. It is also apparent from an examination of the table that when the vinyl aromatic and the alkylating agent remain constant, increasing the length of the carbon chain of the acylating agent from 2 to 14 increases the pour point depressant potency of the additive. Particularly outstanding are those acylating agents containing from 12 to 18 carbon atoms.

As was mentioned above, valuable pour depressing additives may be made by combining pour depressants manufactured according to the instant invention which have side chains of different carbon chain length. For example, by combining a polymerized vinyl aromatic having side chains with an average number of 12 carbon atoms with a vinyl aromatic polymer having an average number of 16 carbon atoms, there may be obtained as a final result a pour depressing additive having a pour depressing potency greater than either one or the other of the two constituents of the mixture alone in a particular viscosity grade oil.

In accordance with this concept of the invention, mixtures of vinyl aromatic polymers alkylated to different side chain length were admixed and the mixtures blended in lubricating oil bases. Results of ASTM pour point tests on these blends are set out in Table II below.

Table II
PHYSICAL MIXTURES OF ALKYLATED AND ACYLATED POLYSTYRENE SUMMARY OF A. S. T. M. POUR DATA

| Additive Equal Parts of Products from Example | Additive Conc., Percent | A. S. T. M. Pour, °F.—Mid-Continent Oils, SAE | | |
|---|---|---|---|---|
| | | 10 | 20 | 30 |
| II | 0 | +5 | +10 | +15 |
| | 0.01 | −10 | +5 | +10 |
| III | 0.03 | −15 | −10 | −5 |
| | 0.05 | −25 | −20 | −10 |
| | 0.10 | −35 | −30 | −30 |
| II | 0.01 | +5 | +5 | +5 |
| | 0.03 | −15 | −5 | +5 |
| IV | 0.05 | −15 | −25 | 0 |
| | 0.10 | −35 | −25 | −15 |
| III | 0.01 | 0 | +5 | +10 |
| | 0.03 | −15 | −25 | +5 |
| IV | 0.05 | −20 | −25 | −15 |
| | 0.10 | −30 | −30 | −25 |

Although the products possessing varying alkyl or acyl chain lengths may be used as a physical mixture it is preferred to incorporate alkyl or acyl groups of different chain lengths by direct synthesis. Thus, acyl groups of 12 to 18 carbon atoms may be incorporated into the product by employing mixed acid chlorides containing varying ratios of 12, 14, 16 and 18 carbon atoms. Acid chlorides containing such mixed acyl chain lengths may be conveniently prepared from fatty acids derived from coconut fatty esters.

The pour depressing additives of this invention are perfectly compatible with other additive materials and may be blended successfully with lubricating oil compositions containing minor amounts of other pour depressors, viscosity index improvers, rust inhibitors, oiliness agents, oxidation inhibitors, and the like.

To summarize briefly, this invention relates to lubricating oil additives having pour depressing properties, and the process of their preparation. The additive materials of this invention are prepared by the simultaneous polymerization, alkylation and acylation of vinyl aromatic compounds or derivatives of vinyl aromatic compounds in the presence of an alkylating agent and a complex of a Friedel-Crafts catalyst and an alkyl acid chloride. In the preferred embodiment of the invention styrene is admixed in a suitable diluent with a chlorinated paraffin wax containing from 8 to 14.5% chlorine and to the mixture is added an aluminum chloride catalyst-acid chloride complex, said acid chloride complex containing from 2 to 24 carbon atoms.

What is claimed is:

1. An improved process for the manufacture of a lubricating oil additive material having the desirable characteristic of depressing the pour point of lubricating oils into which it is incorporated which comprises admixing a vinyl aromatic hydrocarbon compound and a halo-alkane in a polar solvent, adding thereto a complex obtained by admixing a Friedel-Crafts catalyst with a saturated organic monobasic carboxylic acid chloride having from 2 to 24 carbon atoms, maintaining the temperature of the mixture at one within the range of from −20° C. to about 50° C. for a period of time sufficient to polymerize substantially all of the vinyl aromatic, and thereafter raising the reaction temperature to one within a range of from 60° C. to 100° C. to complete the reaction.

2. A process according to claim 1 wherein the vinyl aromatic is styrene, the alkylating agent is a chlorinated paraffin wax containing from 8 to 14.5% chlorine, the Friedel-Crafts catalyst is aluminum chloride and the acid chloride contains from 10 to 20 carbon atoms in the organic portion thereof.

3. An improved process for the manufacture of a lubricating oil additive material having the desirable characteristic of depressing the pour point of lubricating oils into which it is incorporated which comprises admixing substantially equimolar proportions of a vinyl aromatic hydrocarbon compound and a halo-alkane containing from 8 to 14.5% halogen in an inert, polar diluent, adding to said mixture a complex formed by admixing substantially equimolar proportions of a Friedel-Crafts catalyst and a saturated organic monobasic carboxylic acid chloride containing from 2 to 24 carbon atoms, maintaining the temperature of the reaction mixture at about −20° C. to about 50° C., for a period of time sufficient to polymerize substantially all of the vinyl aromatic, and thereafter raising the temperature of the reaction to about 60° C. to 100° C. to complete the reaction.

4. An improved lubricating oil additive material having the desirable characteristic of depressing the pour point of waxy mineral lubricating oils into which it is incorporated which consists essentially of a polymerized, alkylated, acylated vinyl aromatic hydrocarbon compound which has been prepared by admixing a vinyl aromatic compound and a halo-alkane in a polar solvent adding thereto a complex obtained by admixing a Friedel-Crafts catalyst with a saturated organic monobasic carboxylic acid chloride having from 2 to 24 carbon atoms, maintaining the temperature of the mixture at one within the range of from −20° C. to about 50° C. for a period of time sufficient to polymerize substantially all of the vinyl aromatic, and thereafter raising the reaction temperature to one within a range of from 60° C. to 100° C. to complete the reaction.

5. An improved lubricating oil additive material having the desirable characteristic of depressing the pour point of waxy mineral lubricating oils into which it has been incorporated which consists essentially of a polymerized, alkylated, acylated vinyl aromatic compound which has been prepared by admixing substantially equimolar proportions of a vinyl aromatic hydrocarbon compound and a halo-alkane containing from 8 to 14.5% halogen in an inert, polar diluent, adding to said mixture a complex formed by admixing substantially equimolar proportions of a Friedel-Crafts catalyst and a saturated organic monobasic carboxylic acid chloride containing from 2 to 24 carbon atoms, maintaining the temperature of the reaction mixture at about −20° C. to about 50° C. for a period of time to polymerize substantially all of the vinyl aromatic, and thereafter raising the temperature of the reaction to about 60° C. to 100° C. to complete the reaction.

References Cited in the file of this patent

UNITED STATES PATENTS

| 1,683,402 | Ostromislensky | Sept. 4, 1928 |
| 2,004,069 | Bruson | June 4, 1935 |
| 2,072,120 | Mikeska | Mar. 2, 1937 |
| 2,147,547 | Reiff et al. | Feb. 14, 1939 |
| 2,197,709 | Ralston et al. | Apr. 16, 1940 |
| 2,197,710 | Ralson et al. | Apr. 16, 1940 |
| 2,288,319 | Mikeska et al. | June 30, 1942 |
| 2,500,082 | Lieber et al. | Mar. 7, 1950 |